Patented Oct. 8, 1940

2,217,363

UNITED STATES PATENT OFFICE 2,217,363

PROCESS FOR PRODUCING FATTY ACIDS AND RESINOUS MATERIALS FROM FATTY GLYCERIDES

Artur Greth and Fritz Lemmer, Wiesbaden, Germany, assignors to The Resinous Products & Chemical Company, Philadelphia, Pa.

No Drawing. Application March 22, 1937, Serial No. 132,299. In Germany April 22, 1936

6 Claims. (Cl. 260—415)

This invention relates to a method for preparing fatty acids from glycerides of vegetable or animal nature and more particularly to a method for producing these acids which at the same time will produce resinous materials that are valuable in the preparation of oleo-resinous varnishes.

Heretofore fatty acids have been produced from natural glycerides by splitting them with water in the presence of a catalyst or by saponifying them with strong alkali and recovering both the fatty acids and the glycerine.

It has now been found that fatty acids can be quantitatively prepared from glycerides by heating the latter with a non-volatile resin acid or resin of acidic nature. During the heating the resin acid replaces the original fatty acid of the glyceride setting the latter free so that it can be readily removed from the reaction mixture by distillation, preferably under reduced pressure, either during or after the reaction between the natural glyceride and the resin acid. Distillation during the reaction is particularly advantageous when the glyceride tends to polymerize on heating as is the case with many unsaturated glycerides such as linseed and China-wood oils, etc. The residue left after the distillation of the fatty acids is a practically neutral ester of glycerine and the resin acid. It may be solid or liquid according to the resin acid employed and can be used in the manufacture of varnishes in place of estergum or esterified synthetic resins. If the residue has too high a melting point for this purpose, it may be modified by mixing it with a suitable lower melting, natural or artificial resin.

All vegetable and animal oils and fats which are esters of glycerine may be used in this process. Examples of these materials are tallow, stearine, nut oils, olive oil, poppy seed oil, linseed oil, fish oils such as sardine oil and whale oil, etc. Furthermore modified fats, such as the triglyceride of octadecadienylic acid obtained by heating castor oil, may also be used provided they do not contain any polymerized constituents.

The acidic resins which may be used vary widely in character but they must be free of volatile acid constituents and have a sufficiently great acidity to enable them to enter into the reaction with the natural glyceride. Such non-volatile, acidic materials are, for example, the residue obtained on distilling rosin, acid phenol-aldehyde resins obtained by the action of rosin on phenol-aldehyde condensation products, condensation products of maleic or similar acids with unsaturated compounds containing a pair of conjugated double bonds such as rosin or abietic acid, China-wood oil, butadiene, or terpene-like compounds, etc. It is also understood that those acids which apparently decompose and distill at high temperatures, but which at somewhat lower temperatures are capable of replacing the fatty acid of the glyceride without forming any volatile compounds other than the fatty acids may also be used in this process.

The distillation of the fatty acid is carried out preferably under reduced pressure and may be assisted by blowing steam through the material in the still.

The following examples will serve to illustrate the invention which, however, is not limited to the exact materials, time, temperature, etc., shown as it may otherwise be practiced within the scope of the appended claims.

Example 1

100 parts of the residue obtained by the vacuum distillation of rosin, having an acid number of 141, and 50 parts of sardine oil are heated six hours at 265° C. and then distilled in vacuo until the temperature of the still bottoms has reached 300° C. The distillate consists of 47 parts of clear sardine oil fatty acids having an acid number of 176. The residue consisted of 97 parts of a solid, resinous material having an acid number of 12.4.

Example 2

100 parts of the residue obtained by vacuum distilling a modified phenolic resin made from 100 parts of rosin and 20 parts of a phenol-formaldehyde condensation product and having an acid number of about 100 was mixed with 50 parts of linseed oil and heated to 290° to 300° C. in vacuo. 50 parts of volatile constituents having an acid number of 174.1 and containing 95.5% of linseed oil fatty acids was obtained. The residue was a resinous material having an acid number of 11.2.

It is claimed:

1. The process of preparing substantially pure fatty acids of drying oils which comprises heating the glyceride of a drying oil fatty acid with a non-volatile acidic resinous material under reduced pressure whereby the fatty acid is distilled out as it is formed.

2. The process of preparing substantially pure fatty acids of drying oils which comprises heating the glyceride of a drying oil fatty acid with a non-volatile acidic resinous material under reduced pressure, the acid content of which is sufficient to replace all the fatty acid of the glyceride whereby the fatty acid is distilled out as it is formed.

3. The process of preparing substantially pure fatty acids of drying oils which comprises heating the glyceride of a drying oil fatty acid at temperatures of from about 250° C. to about 300° C. under reduced pressure with a non-volatile acidic resinous material, the acid content of which is sufficient to replace all the fatty acid of the glyceride whereby the fatty acid is distilled out as it is formed.

4. The process of preparing substantially pure fatty acids of drying oils which comprises heating the glyceride of a drying oil fatty acid under reduced pressure with the non-volatile acidic residue from the distillation of rosin, whereby the fatty acid is distilled out as it is formed.

5. The process of preparing substantially pure fatty acids of drying oils which comprises heating the glyceride of a drying oil fatty acid under reduced pressure with the non-volatile acidic residue from the distillation of a rosin modified phenol-aldehyde resin, whereby the fatty acid is distilled out as it is formed.

6. The process of preparing substantially pure fatty acids of drying oils which comprises heating the glyceride of a drying oil fatty acid under reduced pressure with the non-volatile acidic residue from the distillation of a natural resin, whereby the fatty acid is distilled out as it is formed.

ARTUR GRETH.
FRITZ LEMMER.